United States Patent
Zhang et al.

(10) Patent No.: US 9,813,622 B2
(45) Date of Patent: Nov. 7, 2017

(54) COLOR CORRECTED HIGH RESOLUTION IMAGING

(71) Applicant: Futurewei Technologies, Inc., Plano, TX (US)

(72) Inventors: Dong-Qing Zhang, Branchburg, NJ (US); Radhakrishna Dasari, Buffalo, NY (US); Jie Hu, Amherst, NY (US); John Wus, Yardley, PA (US)

(73) Assignee: Futurewei Technologies, Inc., Plano, TX (US)

(*) Notice: Subject to any disclaimer, the term of this patent is extended or adjusted under 35 U.S.C. 154(b) by 71 days.

(21) Appl. No.: 14/810,131

(22) Filed: Jul. 27, 2015

(65) Prior Publication Data

US 2017/0034434 A1  Feb. 2, 2017

(51) Int. Cl.
*H04N 5/232* (2006.01)
*H04N 5/247* (2006.01)
*H04N 9/04* (2006.01)

(52) U.S. Cl.
CPC ..... *H04N 5/23238* (2013.01); *H04N 5/23229* (2013.01); *H04N 5/247* (2013.01); *H04N 9/04* (2013.01)

(58) Field of Classification Search
CPC .......................... H04N 5/3415; G06T 3/4038
USPC ........................................... 348/36, 143–160
See application file for complete search history.

(56) References Cited

U.S. PATENT DOCUMENTS

| | | | |
|---|---|---|---|
| 2005/0169555 A1* | 8/2005 | Hasegawa | H04N 1/407 382/284 |
| 2009/0052776 A1* | 2/2009 | Panahpour Tehrani | H04N 9/68 382/167 |
| 2009/0284601 A1* | 11/2009 | Eledath | G06K 9/209 348/157 |
| 2013/0070060 A1* | 3/2013 | Chatterjee | H04N 5/2258 348/47 |
| 2014/0072338 A1* | 3/2014 | Kamimura | G03G 21/1853 399/111 |
| 2014/0300687 A1* | 10/2014 | Gillard | G06T 15/20 348/36 |
| 2015/0312445 A1* | 10/2015 | Cha | H04N 5/2226 348/48 |
| 2016/0286138 A1* | 9/2016 | Kim | H04N 5/23238 |
| 2016/0364883 A1* | 12/2016 | Shiiyama | G06T 7/408 |

(Continued)

OTHER PUBLICATIONS

Marks et al. "Engineering a Gigapixel Monocentric Multiscale Camera", Optical Engineering, 51(8), Aug. 2012.

(Continued)

*Primary Examiner* — Shahbaz Nazrul
(74) *Attorney, Agent, or Firm* — Conley Rose, P.C.

(57) ABSTRACT

A high resolution imaging system includes an imaging camera array creating a sets or frames of array images of a scene and a reference camera creating reference images of the same scene. A synchronization controller coordinates imaging of the scene by the imaging camera array and the reference camera. An image processor merges the sets of array images into high resolution images and apply a color correction to the high resolution images based on reference images. Color correction can be performed on the merged high resolution image or on individual array images prior to merger into the high resolution image.

20 Claims, 8 Drawing Sheets

(56) References Cited

U.S. PATENT DOCUMENTS

2016/0373640 A1* 12/2016 van Hoff ............ H04N 5/23206

OTHER PUBLICATIONS

Wilburn et al., "High Performance Imaging Using Large Camera Arrays". ACM Trans. Graph. 24(3), 765-776, Jul. 2005.
Reinhard et al., "Color Transfer Between Images", Applied Perception, IEEE Computer Graphics and Applications, Sep. 2001.

* cited by examiner

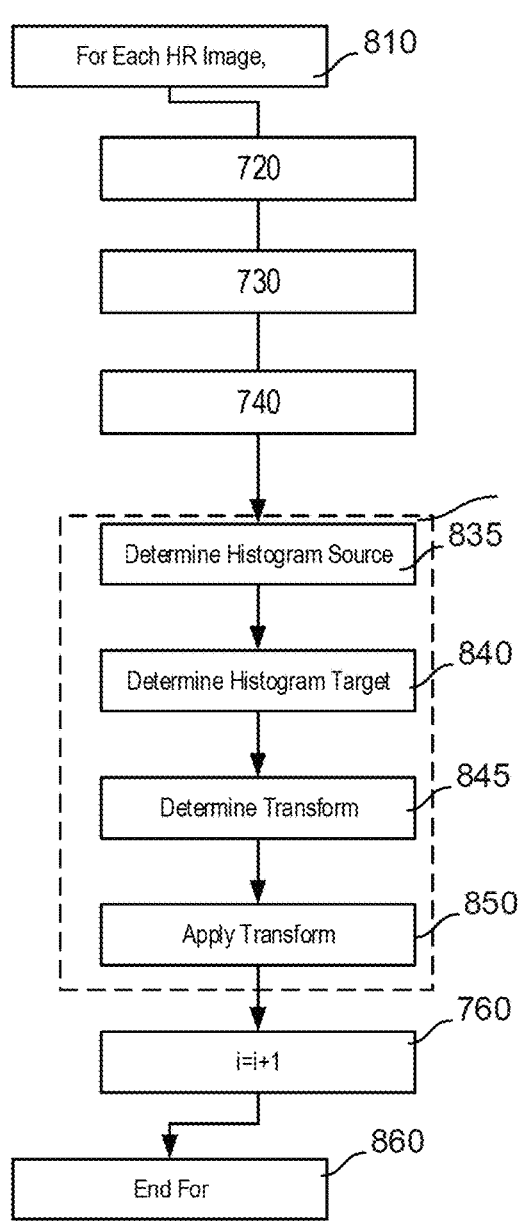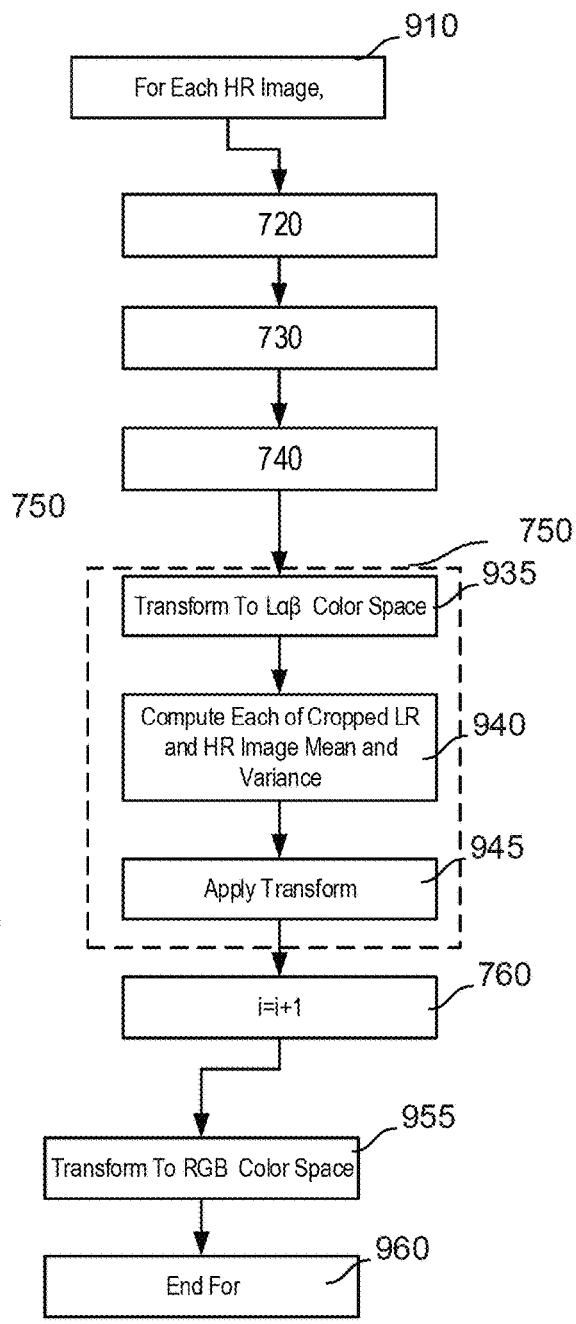

COLOR CORRECTED HIGH RESOLUTION IMAGING

BACKGROUND

Arrays of video and still imaging cameras have been created to generate images of scenes in very high resolution. Camera arrays generate a plurality of images which are then merged to create a high resolution image. Color correction techniques have been applied to the high resolution images based on automatic color matching between the respective images from the array. The accuracy of these color correction techniques under these conditions is limited in the ability to present an accurate color representation of the scene being imaged.

SUMMARY

The technology includes an imaging apparatus having camera array, a reference camera, a camera synchronization controller and an image processor. The camera array comprises a plurality of imaging cameras, each having a camera field of view, each camera field of view offset with respect to at least one adjacent imaging camera field of view, the camera field of views combined to provide an array field of view. The reference camera has a field of view at least partially overlapping the array field of view. The synchronization controller is coupled to the camera array and the reference camera, and directs imaging of a scene in the reference camera field of view and the array field of view. The reference camera provides at least one reference image of the reference camera field of view. The image processor creates a high resolution image from the array images and applies a color correction based on at least one reference image to the high resolution image formed from the plurality of array images either before or after creating of the high resolution image.

In another aspect, a method of creating a color corrected high resolution image is provided. The method includes obtaining a set of a plurality of at least partially overlapping commonly exposed images of a field of view of a first scene. The method further includes obtaining a reference image of a second field of view including the scene. The reference image has a greater color depth than each of the plurality of at least partially overlapping commonly exposed images. A color correction is applied to the plurality of at least partially overlapping images based on the color depth of the reference image to create a color-corrected high resolution image.

In a further aspect, a high resolution imaging device includes a first camera system, a second, reference camera system and an image processor. The first camera system is adapted to generate video imaging comprising a plurality of frames. Each frame comprises a set of plurality of commonly exposed images of a scene. Each of the plurality of commonly exposed images includes at least a portion of a field of view of the scene and at least partially overlaps at least one adjacent image having a different portion of the field of view. The second camera system is adapted to generate a plurality of reference images of the scene from a reference field of view. Each of the plurality of reference images has a color depth greater than a color depth of each of the plurality of commonly exposed images, at least a portion of the plurality of reference images commonly exposed with ones of the plurality of frames. The image processor includes a color corrector to apply a color correction based on at least one of the plurality of reference images to a corresponding one of the plurality of frames, and an image stitcher to create a high resolution image from the color corrected plurality of images.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 8 is a flow diagram illustrating a first embodiment of determining a color correction between a reference image and one of a plurality of array images prior to creation of a high resolution image.

FIG. 9 is a flow diagram illustrating another embodiment of determining a color correction between a reference image and one of a plurality of array images prior to creation of a high resolution image.

DETAILED DESCRIPTION

Figure 1:
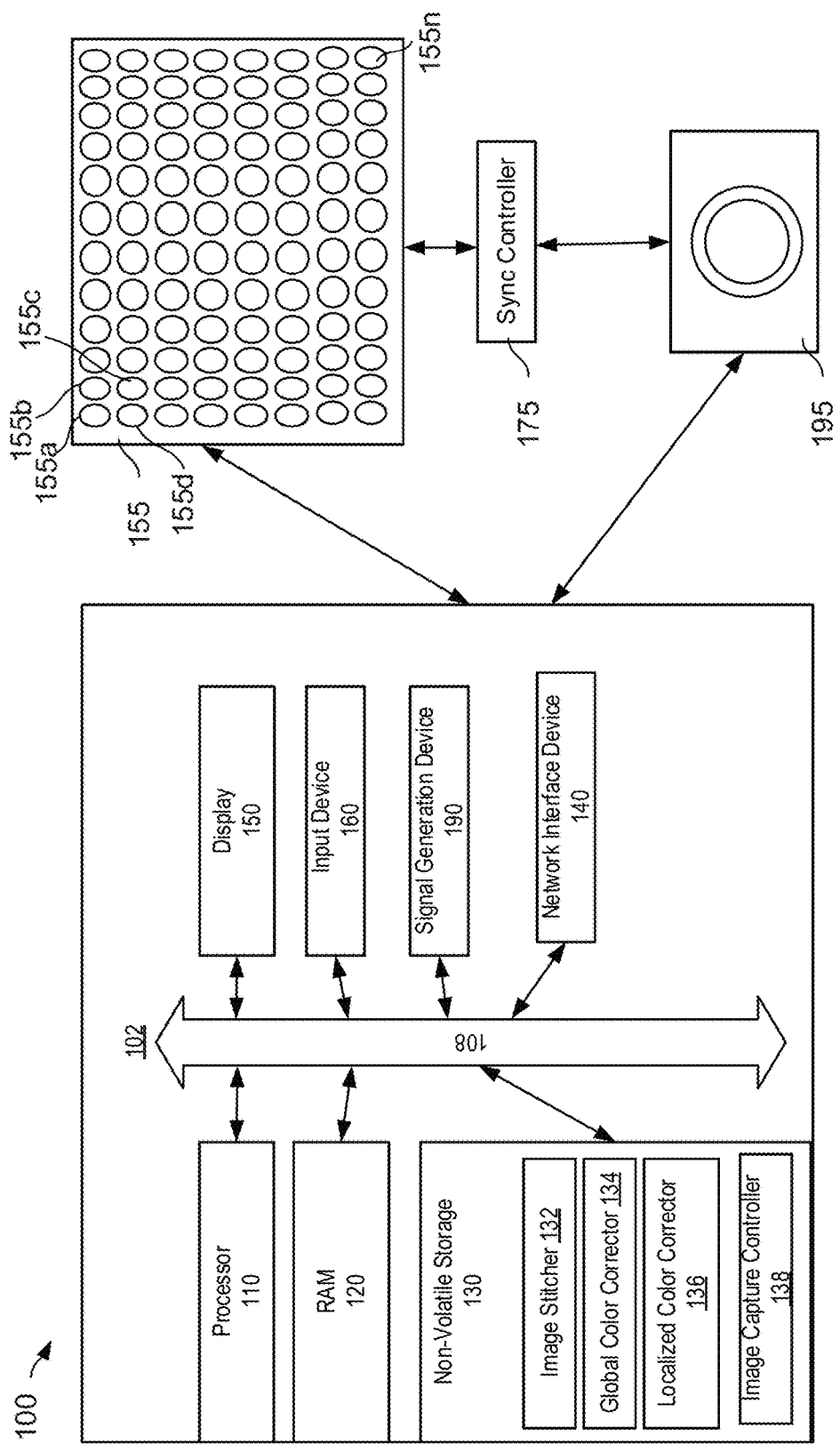
FIG. 1 depicts a first embodiment of a high resolution imaging apparatus with color correction.

Technology is presented to enhance the color of high resolution video and still imaging. The technology includes an apparatus having an imaging camera array creating a plurality of array images of a scene and a reference camera creating a reference image of the same scene. A synchronization controller coordinates imaging of the scene by the imaging camera array and the reference camera. An image processor is utilized to merge the array images into a high resolution image and apply a color profile from a reference image to the high resolution image. Color correction can be performed on the merged high resolution image or on individual array images prior to merger into the high resolution image.

Imaging camera arrays have been utilized to provide high resolution array images which are created by stitching together the array images created by the array. The result is a high-resolution still image or video frame which can be utilized in the numerous products. Camera resolution is one of the factors which affects the perceptual quality of pictures and videos. Another factor is the color quality of the picture. Normally, after image stitching, the overall contrasting color of the picture will be degraded. Previous embodiments of imaging camera arrays use color enhancement algorithms in an attempt to optimize the color the picture so that it looks more visually pleasing to the human eye. However, these color correction algorithms do not recover the true color of the captured scene. In addition, color information has been partially lost during the imaging process, the improvement by color enhancement limited due to lack of information.

The present technology applies color correction based on the reference camera's high color quality image of a scene which is commonly exposed by the imaging camera array. The output of the imaging camera array is a set of array images of the scene which are merged or stitched to create a high resolution image. Various techniques of color correction may be used as described herein.

As used herein, commonly exposed images are images that are created in relatively close temporal proximity. As such, a set of array images may be commonly exposed with each other if they are simultaneously exposed (all array cameras imaging in parallel) or in temporal proximity such that their merging creates a relatively uniform high resolution image based on their exposure of a scene. Commonly exposed images may be simultaneously exposed, but simultaneous exposure is not required. Reference images may be commonly exposed with array images where the temporal separation between the reference and array images would not frustrate applying the color profile of the reference image of a scene from the reference image to a high resolution image created from the set of array images. In view of the foregoing, temporal separation for commonly exposed array images within a set of array images for a scene should be small, on the order of fractions of a second, in order to preserve details of the scene. Temporal separation for commonly exposed images between a reference image and a set of array images may be longer, on the order of seconds, but may also be fractions of a second or exposed simultaneously.

FIG. 1 illustrates a first embodiment of an apparatus 100 in accordance with the present technology. Imaging apparatus 100 includes an imaging camera array 155, a reference camera 195, a synchronization (sync) controller 175 coupled to both the imaging camera array 155 and the reference camera 195 and an image processor 102 also operationally coupled to array 155 and camera 194. Connection between the synchronization controller 175, processor 102 camera 195 and array 155 may be by a direct wired connection, direct wireless connection or wired/wireless network connection. The sync controller 175 may be a standalone controller operable to control the exposure of the imaging camera array 155 and the reference camera 195 to ensure common exposure between reference camera and the imaging camera array 155 when both directed at a scene (as in FIG. 2 herein). Imaging camera array 155 may be comprised of a plurality of individual imaging camera array cameras, four of which array cameras 155a, 155b, 155c and 155d are noted in FIG. 1. In one embodiment, each of the array cameras illustrated in imaging camera array 155 is of identical construction such that the lenses, controller, image sensor and any camera controller attached thereto may be identical.

Any number and arrangement of array cameras 155a, 155b, 155c, 155d . . . 155n (where "n" is any whole number) may be utilized in the imaging camera array 155. Each array camera 155a, 155b, 155c, 155d . . . 155n has a field of view which partially overlaps an adjacent cameras field of view.

For example, camera 155a has a field of view overlapped by cameras 155b, 155c and 155d. In some embodiments, no overlap between adjacent cameras is used; in other embodiments, the amount of overlap between adjacent cameras—for example array cameras 155b and 155c—is up to 50% of each camera's field of view. Each array camera in such example may have from one to eight overlapping array camera fields of view. For example, array camera 155a may have three overlapping fields of view while camera 155c may have eight overlapping fields of view. As a result, each array image created by an array camera will partially overlap an adjacent array image on one or more sides. Those cameras in the imaging camera array 155 positioned so as to be surrounded by eight cameras will have potentially eight overlapping regions. It should be understood that the amount of overlap between the adjacent cameras in the array may be determined in accordance with the particular configuration of the imaging camera array 155.

Each array camera 155a, 155b, 155c, 155d . . . 155n may be independently controlled and coupled to an independent control processor coupled to the sync controller and/or the image processor 102. Each array camera 155a, 155b, 155c, 155d . . . 155n may have a resolution from one to many mega-pixels. Each array camera 155a, 155b, 155c, 155d . . . 155n may comprise a still image camera or a video camera operable to provide video at a frame rate of 24-300 frames per second (fps). In the context of this disclosure, discussion of processing of an "image" is equivalent to processing a "frame" of image data from a video stream.

Examples of imaging camera arrays suitable for use in accordance the present technology are described in 2005. *High performance imaging using large camera arrays*. ACM TOG 24, 3, 765-776 and the AWARE2 Multiscale Gigapixel Camera (http://www.disp.duke.edu/projects/AWARE/index.ptml). In the context of this technology, the imaging camera array can be any type of image capture system which provides a set of commonly exposed adjacent images from which a merged image or video frame may be created as a high-resolution image and/or video frame, and which would benefit from color correction based on lack of color fidelity resulting from creation of a merged high-resolution image. Although the imaging camera array is illustrated as a rectangular grid, the imaging camera array may be arranged with array cameras in various configurations. One example of another embodiment of an semi-spherical imaging camera array is given in Marks, D. L., H. S. Son, J. Kim, and D. J. Brady, *Engineering A Gigapixel Monocentric Multiscale Camera*. Optical Engineering, 2012. 51(8)

Reference camera 195 may comprise a lower resolution camera utilized to provide a reference image having a high color quality reference image. For example, where the color depth of an array camera pixel may be on the order of 8 bits or 16 bits, the color depth of the reference camera may be on the order of 24 bits. However, the resolution of a reference image from the reference camera will be much lower than a merged high resolution image created from array images combined from the imaging camera array.

Apparatus 100 also includes image processor 102. Image processor 102 may include, for example, a microprocessor 110, random access memory 120, nonvolatile storage 130, a display 150, an input device 160, a signal generation device 190, and a network interface device 140. In certain embodiments, the image processor 102 may comprise a personal computer, mobile computer, mobile phone, tablet, or other suitable processing device. In other embodiments, the image processor 100 may comprise an application-specific integrated circuit were in the functions described below are implemented in hardware.

Illustrated in non-volatile storage 130 are functional components which may be implemented by instructions operable to cause processor 110 to implement one or more of the processes described below. While illustrated as part of non-volatile storage 130, such instructions may operate to cause the processor to perform various processes described herein using any one or more of the hardware components illustrated in FIG. 1. These functional components include an image stitcher 132, a global color corrector 134, a localized color corrector 136 and an image capture controller 138. The image stitcher 132 may operate to combine commonly exposed array images from imaging camera array 155 into a single high resolution image. A global color corrector 134 may operate to perform a color correction process as described herein to apply color correction to a high resolution image combined from the commonly exposed array images. The localized color corrector may operate to perform a color correction process on individual ones of commonly exposed array images prior to combination of the commonly exposed array images into a high resolution image. The image capture controller 138 may provide a signal to the sync controller to create commonly exposed array images and reference images of a common or overlapping field of view of the imaging camera array and the reference camera. In another embodiment, image capture controller need not be used, and image capture control is provided by sync controller 175.

Sync controller 175 and image processor 102 may be combined as a single device or as separate devices. In another embodiment, the imaging camera array 155 and reference camera 195 along with the sync controller 175 and image processor 102 may be incorporated into a single housing as an integrated device. Single housing embodiments can include mobile processing devices such as tablets and hand-held processing devices having processors and cellular radios, such as cellular telephones.

Non-volatile storage 130 may comprise any combination of one or more computer readable media. The computer readable media may be a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Where image processor 102 is a general purpose computer system, the computer system can include a set of instructions that can be executed to cause the image processor 102 to perform any one or more of the methods or computer based functions disclosed herein. Computer program code for carrying out operations for aspects of the present disclosure may be written in any combination of one or more programming languages, including an object oriented programming language conventional procedural programming languages. The program code may execute entirely on the image processor 102, partly on the image processor 102, as a stand-alone software package, partly on the image processor 102 and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

As illustrated in FIG. 1, the image processor 102 includes a processor 110. A processor 110 for image processor 102 is configured to execute software instructions in order to perform functions as described in the various embodiments herein. A processor 110 for an image processor 102 may be a general purpose processor or may be part of an application specific integrated circuit (ASIC). A processor 110 for an image processor 102 may also be a microprocessor, a microcomputer, a processor chip, a controller, a microcontroller, a digital signal processor (DSP), a state machine, or a programmable logic device. A processor 110 for an image processor 102 may also be a logical circuit, including a programmable gate array (PGA) such as a field programmable gate array (FPGA), or another type of circuit that includes discrete gate and/or transistor logic. A processor 110 for an image processor 102 may be a central processing unit (CPU), a graphics processing unit (GPU), or both. Additionally, any processor described herein may include multiple processors, parallel processors, or both. Multiple processors may be included in, or coupled to, a single device or multiple devices.

Moreover, the image processor 102 includes a RAM 120 and a non-volatile storage 130 that can communicate with each, and processor 110, other via a bus 108. Memories described herein are tangible storage mediums that can store data and executable instructions, and are non-transitory during the time instructions are stored therein. A memory describe herein is an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted.

As shown, the image processor 102 may further include a display unit 150, such as a liquid crystal display (LCD), an organic light emitting diode (OLED), a flat panel display, a solid state display, or a cathode ray tube (CRT). Additionally, the imaging processor may include an input device 160, such as a keyboard/virtual keyboard or touch-sensitive input screen or speech input with speech recognition, and which may include a cursor control device, such as a mouse or touch-sensitive input screen or pad.

Figure 2:
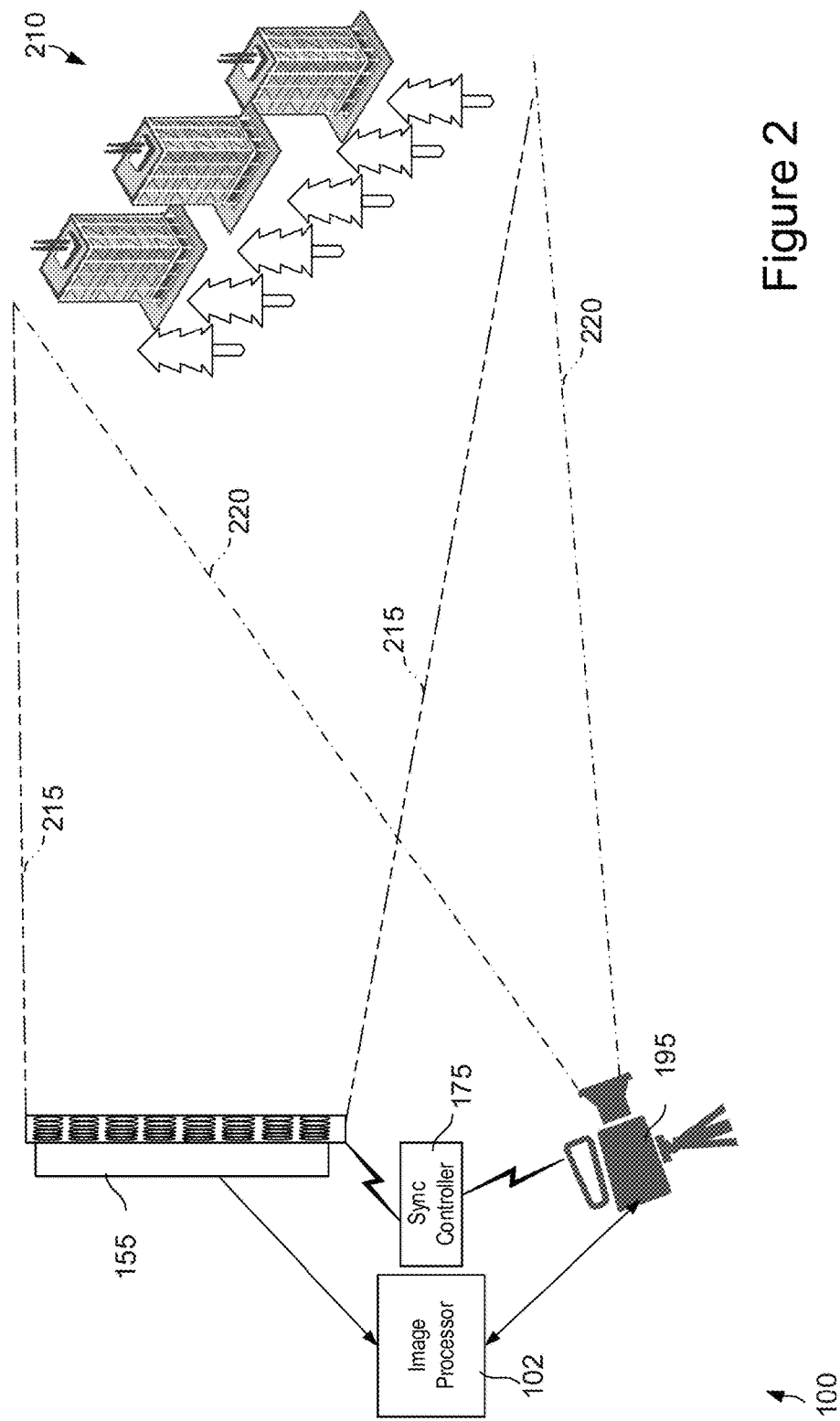
FIG. 2 is a block diagram illustrating a first exemplary use of the high resolution imaging apparatus.

FIG. 2 illustrates an exemplary use of the apparatus 100. As illustrated therein, imaging camera array 155 has a field of view 215 directed at a scene 210. The field of view 215 of the imaging camera array comprises the combined field of views of the array cameras 155a, 155b, 155c, 155d . . . 155n. Reference camera 195 has a field of view 220 defined by the camera optics and the camera sensor where the field of view 220 of the reference camera is also directed at the scene 210. When directed by the sync controller 175, imaging camera array 155 and reference camera 195 begin imaging of scene 210. In one embodiment, sync controller 175 controls timing of each of the imaging camera array 155 and reference camera 195 such that exposures (at respective frame rates of each of the imaging camera array 155 and reference camera 195) exposed at approximately the same time.

The output of imaging camera array 155 comprises a plurality of commonly exposed array images of the scene 210. Commonly exposed array images may comprise simultaneously or near-simultaneously exposed images or video frames created by each of the array camera over time. One set of commonly exposed array images or frames may be used to create a high resolution image or frame. The manner of capture by the imaging camera array is not limited in accordance with the technology. That is, each of the individual array cameras can capture simultaneously, or serially, or in any sequence designed to effectively capture the scene 210.

Capture of the commonly exposed array images may be likewise synchronized by the sync controller 175 with the capture of reference images from the reference camera 195. Reference images may be commonly exposed with a set of array images, may be simultaneously exposed with a set of array images, or may precede exposure of a set of array images. In some embodiments, one reference image may be utilized with multiple sets of commonly exposed array images or frames. In such configuration, an array imaging system may have a frame rate exceeding the frame rate of the reference camera and the reference image utilized in the processes described below may comprise a last-in-time image created prior to the color correction process applied to a particular set of array images.

Reference camera 195 has a high color fidelity and quality to capture the color of scene 210. The resolution of reference camera 195 can be significantly lower than the resulting stitched image generated from the array images in the imaging camera array.

Imaging camera array 155 has an effective field of view illustrated by lines 215 which encompasses the scene 210. Reference camera 195 likewise has a field of view represented by lines 220 at least partially overlapping the field of view 215. The respective field of views should be at least partially overlapping, with the field of view 220 of reference camera 195 directed to provide the color reference image of the scene 210. The capture of the reference image and array images from the imaging camera array 155 need not occur exactly simultaneously, but should occur within a timeframe such that the reference color image relative to a commonly exposed set of array images provides a suitable temporal relationship to provide color correction.

Figure 3:
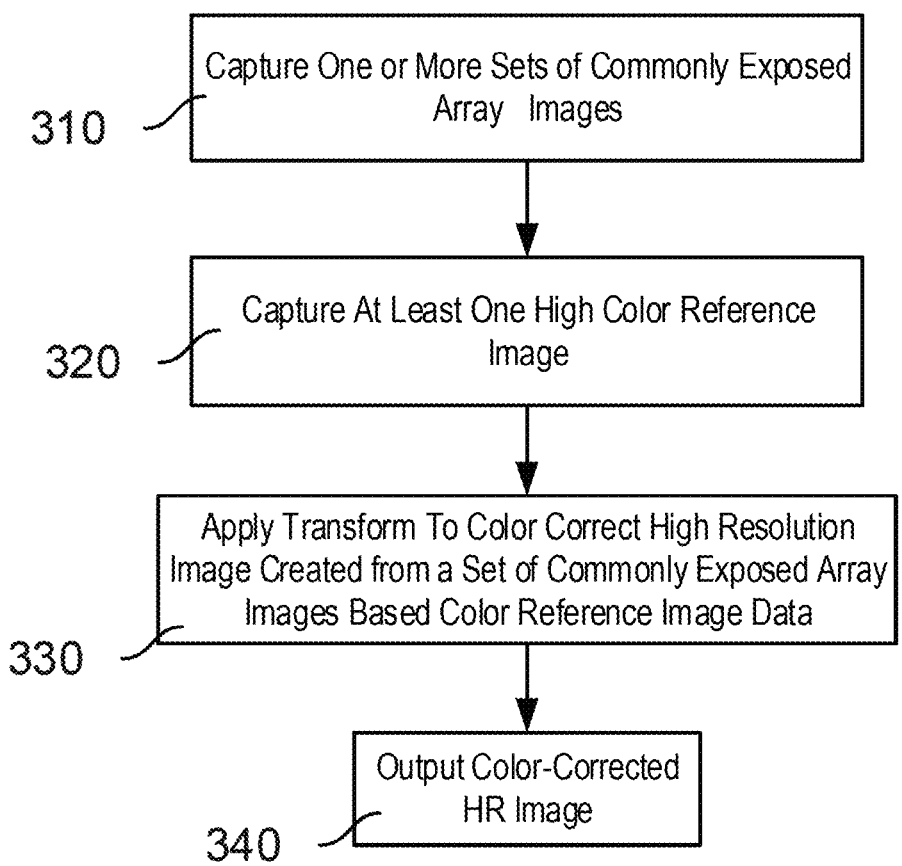
FIG. 3 is a flowchart of a process performed by the high resolution imaging apparatus to create high resolution imaging from a camera array with color correction based on a reference image.

FIG. 3 illustrates an overall process which may be performed by the image processor 102 in order to create high-resolution still and video images. As discussed below, the overall process has several embodiments and may be implemented by instructions operable to instruct a processor 110 to complete the tasks as described herein. At 310, array images of a scene are captured and provided to the image processor 102. Array images are captured by the imaging camera array 155 and may comprise still images or video frames. One or more sets of commonly exposed array images may be captured of a scene to generate one or more high resolution merged images, one merged image from each set of commonly exposed array images. At 320, and before, after or simultaneously with step 310, a high color quality reference image of the scene is captured by the reference camera 195.

At 330, a color profile transform is applied to the array image data which makes up the high-resolution image created by the array images. As discussed below, step 330 may take any number of different embodiments. In one embodiment, the array images are merged or stitched together using any of a number of well-known stitching algorithms to create a single high-resolution image to which color correction can then be applied. Further details on this embodiment are discussed below with respect to FIG. 4. In another embodiment, color profiles are pride to each of the individual array images prior to the stitching or merging process. Further details on this embodiment of step 330 are discussed below with respect to FIG. 7. At 340, a color corrected high-resolution image is provided.

Although FIG. 3 refers to color correction of an image, in one embodiment, one reference image may be utilized for color correction on multiple sets of commonly exposed array images. For example, where the array images are sourced from a video stream having a given frame rate (fps), color correction can be applied from a single reference frame or reference image to a series of frames of array images. In one embodiment, the reference camera may have a frame rate equal to the frame rate of the imaging camera array. In another embodiment, the frame rate of the reference camera may be slower than that of the imaging camera array. For example, if the frame rate of the imaging camera array is 60 fps, the same transform from a reference image or frame may be applied to any number of frames of the video. In yet another embodiment, the frame rate of the reference camera may be greater than the imaging camera array.

Figure 4:
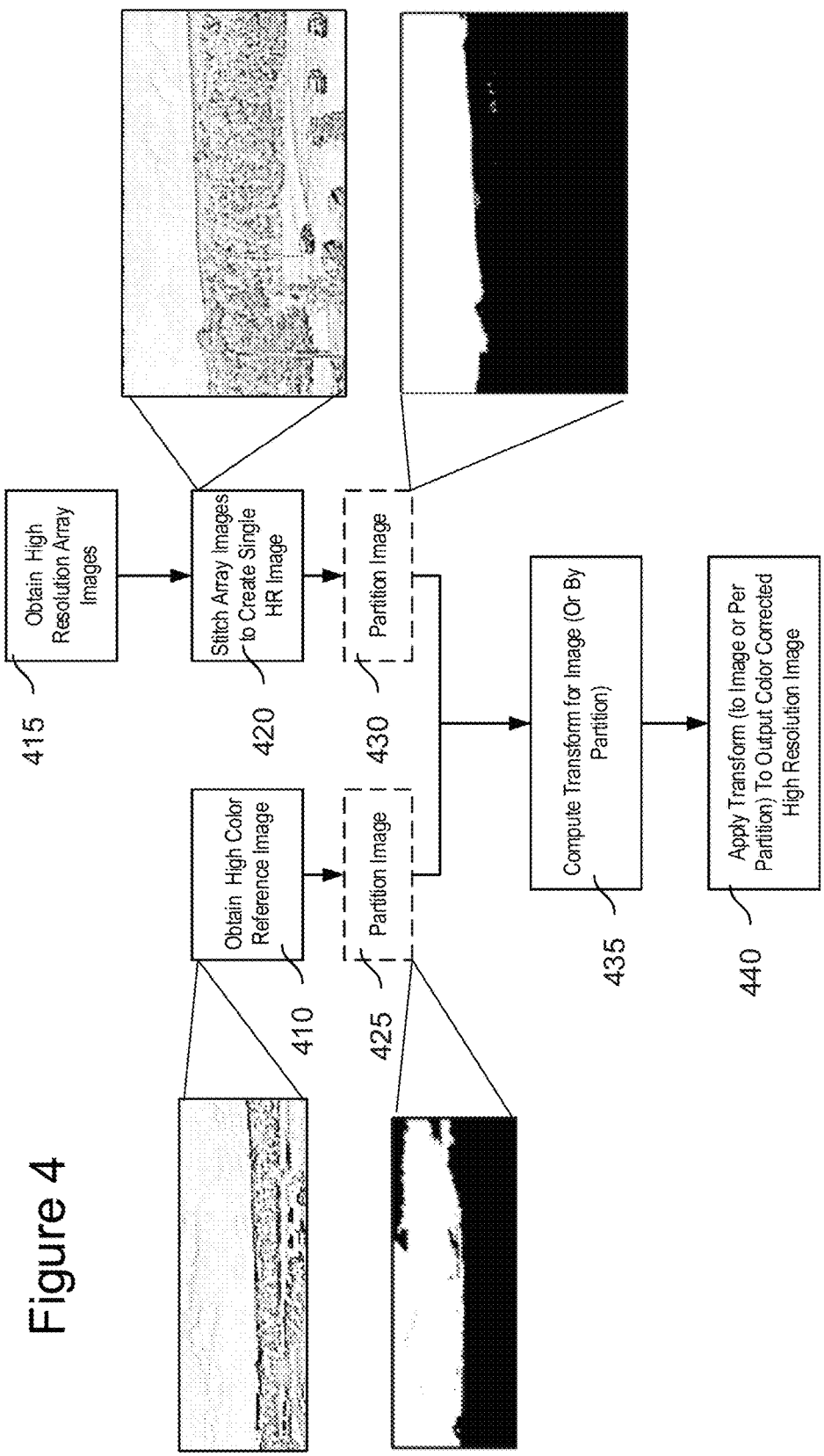
FIG. 4 is a flowchart of a first embodiment of a method performed by an image processor to apply color correction based on a reference image to images generated by imaging apparatus.

FIG. 4 illustrates a process performed by the image processor for applying color correction to a high-resolution image after a commonly exposed set of array images are stitched together to create a high-resolution image. FIG. 4 represents one embodiment of a method for performing step 330 in FIG. 3. In one embodiment, the process illustrated in FIG. 4 may be performed by a global color corrector 134. At 410, a high color quality reference image is obtained. At 415, a set of commonly exposed array images are acquired by the image processor. At 420, the high-resolution images are stitched together to create a single high-resolution image. Image stitching may be performed by any of a number of image stitching algorithms as represented by image stitcher 132. Such algorithms include, without limitation, direct methods employing pixel-to-pixel matching as well as feature-based methods utilizing keypoint detection and feature mapping. The illustration of the steps 410, 415, 420 425, 430 in FIG. 4 indicates that the steps may be performed in parallel in one embodiment. In another embodiment, the steps may be performed sequentially beginning with steps 410 and 415. The choice of ordering of the respective steps may vary depending upon the particular application for which the technology is utilized.

Optionally, at 425 and 430, the reference image and the high-resolution image are partitioned into different color areas to provide the color correction based on each partition individually. In one embodiment, partitioning is not required, hence steps for 425 and 430 are illustrated in dashed lines to indicate their optional nature. In another embodiment, partitioning of each of the respective images may occur based on any of a number of different steps. One example partitioning is image thresholding which separates regions of the image into at least two different partitions based on an intensity threshold.

Figure 5:
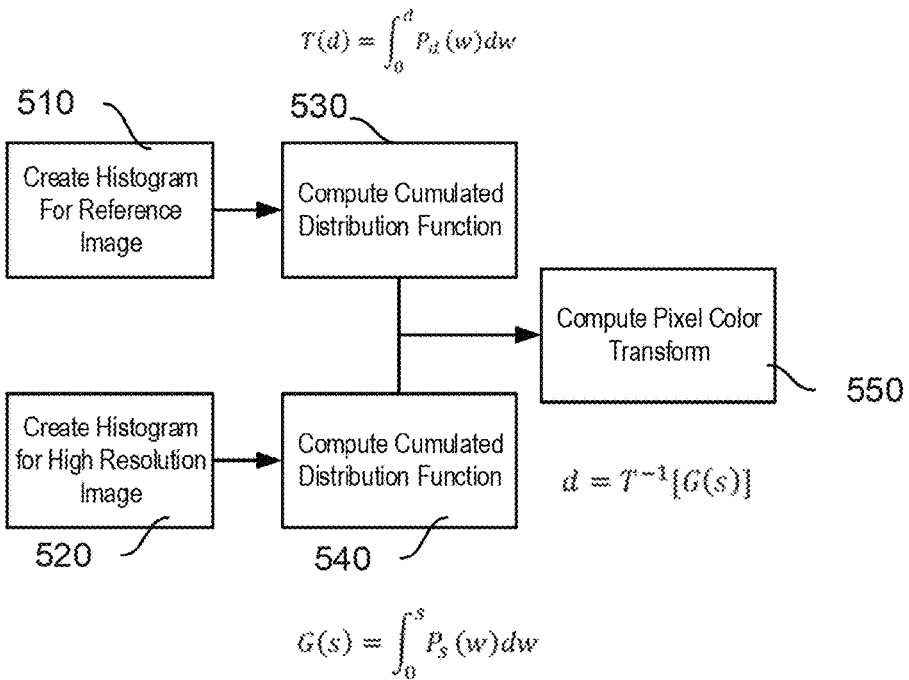
FIG. 5 is a flow diagram illustrating a first embodiment of determining a color correction between a reference image and a high resolution image formed from a plurality of images created by a camera array.
Figure 6:
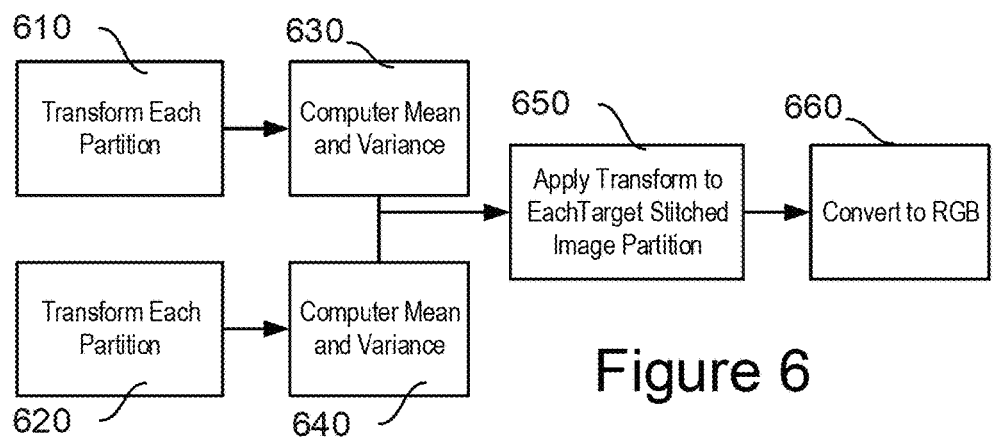
FIG. 6 is a flow diagram illustrating another embodiment of determining a color correction between a reference image and a high resolution image formed from a plurality of images generated by a camera array.

At 435, a color correction transform is computed for applying the color profile of the reference image to the merged high-resolution image. As indicated at 435, this transform may be computed on a partition-by-partition basis, or for the image as a whole. Examples of the transform computation process 435 are illustrated in FIGS. 5 and 6. At 440, the transform is applied to the image or per partition to output a color corrected high-resolution image.

FIG. 5 illustrates one alternative embodiment for performing step 435 of FIG. 4. FIG. 5 illustrates a process creating a color transform for a merged high resolution image based on color histogram specification. Histogram specification is performed by applying the histogram for each color channel per image or per partition from the reference image to the merged high-resolution image. At step 510, a histogram $P_d(w)$ for the reference image (or partition) is created. The cumulative distribution function for the reference image (or partition) is created at 530 and is described by:

$$T(d) = \int_0^d P_d(w) dw$$

At step 520, a histogram $P_s(w)$ for the target image is created. The cumulative distribution function for the target image (or partition) may be created at 540 and is described by:

$$G(s) = \int_0^s P_s(w) dw$$

At 550, the transform calculated at 550. The transform is represented by: $d = T^{-1}[G(s)]$.

Using the transform calculated at 550, the color profile of the target image is corrected by applying the transform calculated for each image or each partition to the high resolution image or partition.

FIG. 6 illustrates another alternative for performing step 435 of FIG. 4 using a color transfer process in accordance with techniques described in Erik Reinhard et al., *Color Transfer between Images*, IEEE Computer Graphics and Applications, v. 21 n.5, p. 34-41, September 2001 (hereinafter "Reinhard et al. 2001").

At 610 and 620, each image or each image partition is transformed to $l\alpha\beta$ color space coordinates. This is performed by first converting the RGB values of each image to a device-independent XYZ space using a first transformation matrix and then to LMS space using a second transformation matrix, followed by converting the data to logarithmic space where L=log L, M=Log M and S=Log S. This conversation from RGB to $l\alpha\beta$ color space allows the l axis to represent an achromatic channel, and the $\alpha$ and $\beta$ channels to represent chromatic yellow-blue and red-green component channels, respectively.

At 630 and 640, the mean and variance of each image is created. The mean and standard deviations provide a set of points in $l\alpha\beta$ space to transfer between the respective images or partitions. The mean and standard deviation are calculated separately for each axis in $l\alpha\beta$ space. First the mean is subtracted from each of the $l\alpha\beta$ space data points:

$$l^* = l - \langle l \rangle$$

$$\alpha^* = \alpha - \langle \alpha \rangle$$

$$\beta^* = \beta - \langle \beta \rangle$$

Next, the data points are scaled by factors determined by their respective standard deviations:

$$l' = \frac{\sigma_t^l}{\sigma_s^l} l^*$$

$$\alpha' = \frac{\sigma_t^\alpha}{\sigma_s^\alpha} \alpha^*$$

$$\beta' = \frac{\sigma_t^\beta}{\sigma_s^\beta} \beta^*$$

After this transformation, the resulting data points have standard deviations that conform to the photograph. Next, instead of adding the averages that we previously subtracted, we add the averages computed for the photograph.

At 650 the data points derived from the reference image are applied to each merged image or each merged image partition. At 660, the image is converted back to the RGB color space for display.

Figure 7:
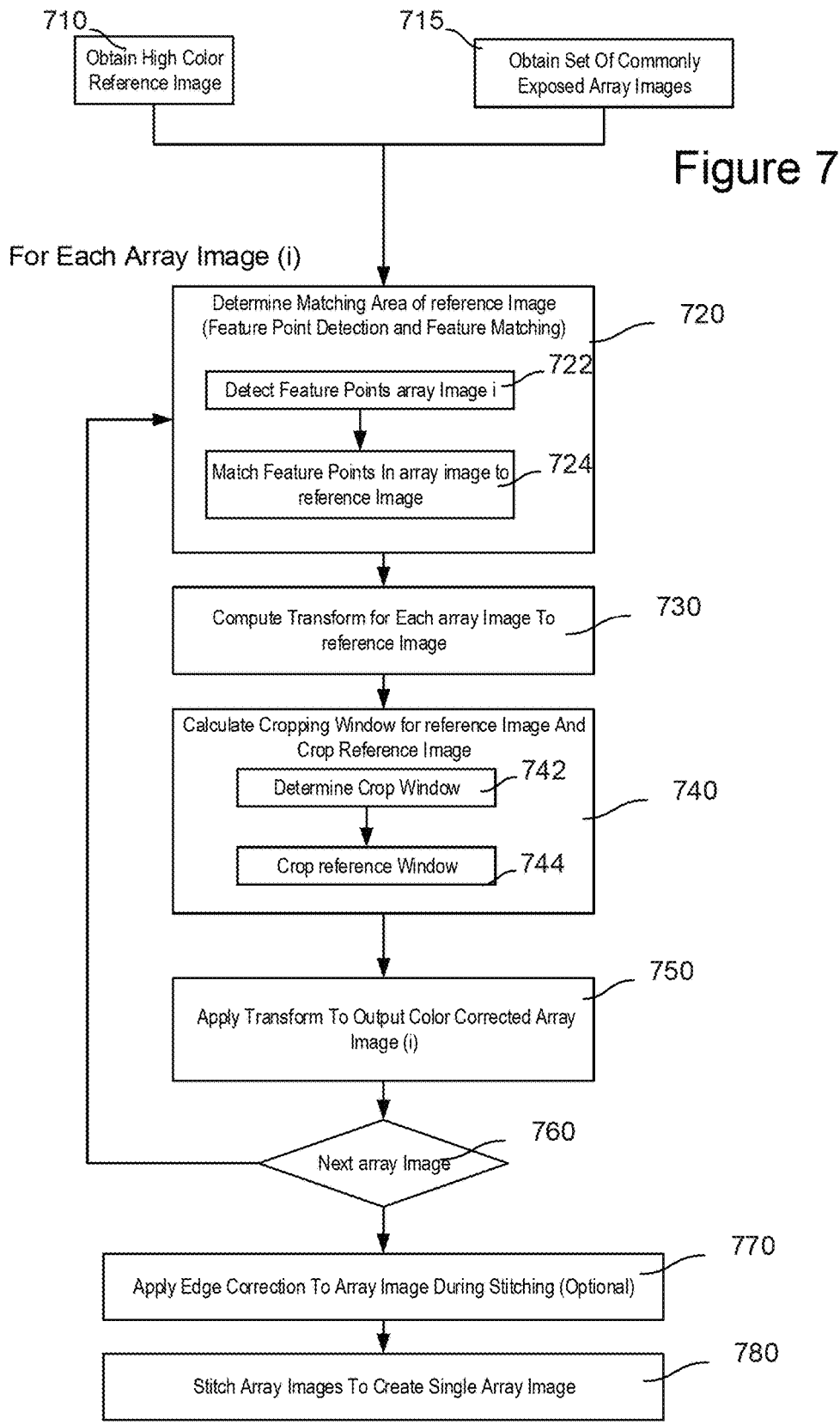
FIG. 7 is a flowchart of a second embodiment of a method performed by an image processor to provide high resolution imaging with color correction based on a reference image.

FIG. 7 illustrates another embodiment for applying color correction to high resolution imaging created from a plurality of array images using apparatus 100. The process of FIG. 7 may be referred to herein as localized color correction in that color correction is applied to each of the plurality of array images prior to creating a merged high resolution image. In another embodiment, an edge color correction process may also be applied prior to merging the array images into a high resolution image. The process of FIG. 7 may be performed by a localized color corrector 136, in FIG. 1. FIG. 7 represents another embodiment of a method for performing step 330 in FIG. 3.

At 710 and 715, a reference image and a plurality of array images are obtained, respectively. Obtaining the images at 710 and 715 is equivalent to steps 410 and 415 in FIG. 4. One reference image may be used for each commonly exposed set of array images or for multiple sets of array images, depending on the frame capture rate of the respective reference camera 195 and imaging camera array 155.

Steps 720, 730, 740 and 750 are applied for each array image in the set of commonly exposed array images obtained at 715.

At 720, for each array image (i), a matching area between the reference image and each array image is determined by, for example, detecting feature points in the array image (i) at 722 and matching the feature points determined in 722 to the reference image at 724. In one embodiment, a scale invariant feature detector such as the scale invariant feature transform (SIFT) (Lowe, David G. (1999). "Object recognition from local scale-invariant features". Proceedings of the International Conference on Computer Vision 2. pp. 1150-1157.doi:10.1109/ICCV.1999.790410) may be used. Generally, keypoints of objects in image (i) are determined at 722 and a corresponding feature points (or objects) are matched in the reference image at 724 by comparing each feature from image (i) to the reference image to find matching features based on Euclidean distance of their feature vectors.

At 730, a matching area transform is computed to apply the feature points to the reference image. The transform comprises a transformation matrix comprising a generally planar homography matrix applies the respective determined feature points to matching feature points in the reference image. Since each array image is only a portion of the field of view of the reference camera (and hence the reference image), the transformation matrix is utilized to determine a cropping area of the reference image matching the array image.

At 740, the image is cropped by first calculating a window for the reference image and then cropping the reference image using the calculated window. At 742, this cropping is performed by determining a cropping window using the transformation matrix in the reference image, following at 744 by cropping the reference image using the calculated cropping window from 742. The color profile of the cropped reference image will be used apply color correction to each array image.

At 750, the color profile of the cropped portion of the reference image is applied to the array image (i) to output a color corrected arraym image (i). At 760, if additional array images (i+1) exist, then the loop continues until all images in the commonly exposed set of array images are color corrected.

When all images ($i_n$) in the commonly exposed set of array images have been corrected, the array images are joined at 780 to create a color corrected high resolution image comprising a merged image of the commonly exposed set of array images.

Optionally at 770, edge color correction may be applied to images to correct for variances in overlapping areas of adjacent array images. The edge correction process may be optional and is discussed below with respect to FIG. 10.

At 780, the color-corrected array images are stitched to create a high-definition array image.

FIGS. 8 and 9 present two embodiments of the application of the color profile of the reference image crop to the array image. In the embodiment illustrated in FIG. 8, a histogram specification process is performed to transfer the color in the cropped referent image to the individual array image. In FIG. 9, a color transfer process in accordance with techniques described in Reinhard et al. 2001. $l\alpha\beta$ correction as discussed above with respect to FIG. 6 is used.

FIG. 8 illustrates the steps of FIG. 7 in that for each array image (i) in a commonly exposed set of array images at 810, steps 720, 730 and 740 are performed as discussed above with respect to FIG. 7. In the embodiment of FIG. 8, step 750 in FIG. 7 may be performed by a histogram specification process similar to that described above with respect to FIG. 5.

In this embodiment, the histogram specification process is applied between the cropper portion of the reference image and each array image in a commonly exposed set of array images. As such, a color histogram for the source (reference crop) image is determined at 835 followed by a determination of a color histogram for the target (i th array image) at 840. At 845, a transform of the form is determined. At 850, the transform for the cropped reference image to the ith array image to provide a color corrected array image (i). The process proceeds at 760 to the next (i+1) image until all images (frames) from the image array are processed.

At 860, the for loop which began at 810 of the method of FIG. 8 is complete, and the loop returns to step 810 until all array images are processed.

FIG. 9 likewise illustrates the steps 720, 730 and 740 of FIG. 7 that are performed for each array image (i) in a commonly exposed set of array images at 810. In the embodiment of FIG. 8, step 750 in FIG. 7 may be performed by a color transfer process in accordance with Reinhard et al. 2001. At 935, each image is transformed to the $l\alpha\beta$ coordinate space. At 940, the mean and variance of each of the array image and the cropped reference image portion are determined, and at 945, the color profile of the reference image portion is applied to the array image. The process proceeds at 760 to the next (i+1) image until all images (frames) from the image array are processed.

At 955, the array images are returned to the RGB color space for display. Note that step 955 may be performed before or after the stitching process.

At 960, the for loop which began at 910 of the method of FIG. 9 is complete, and the method returns to step 910 until all array images are processed.

In the localized embodiment, issues may occur in the application of reference color profiles to individual array images resulting in overlapping regions of adjacent images having mis-matched or slightly different color profiles. Hence, in one embodiment of FIG. 7, an edge correction process may be performed for those array images having an overlapping adjacent array images.

Figure 10:
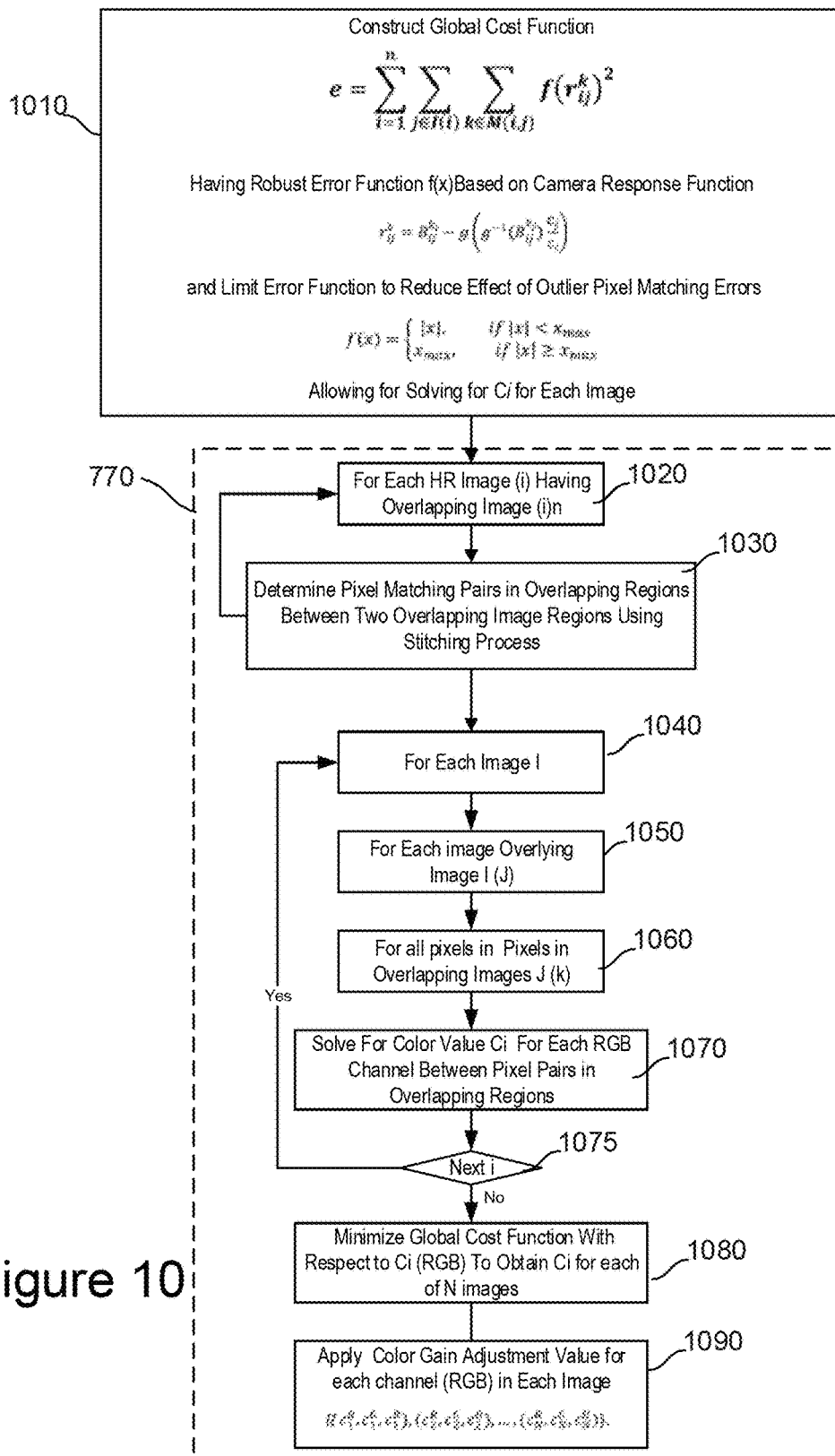
FIG. 10 is a flow diagram illustrating a method performed to perform edge region color correction in ones of a plurality of images used to create a high resolution image.

FIG. 10 illustrates the color correction process for overlapping image pairs, also referred to herein as edge correction. The process illustrated in FIG. 10 is a pair-wise process in that correction is performed for each pair of overlapping images such that the color differences between two overlapping regions in array images from adjacent array cameras are minimized.

Initially, at 1010, a global cost function is created for the overall correction process based on a robust error function. The global cost function accounts for each image i, each pixel j belonging to the set of pixels overlapping with the ith image, and all pixel matching pairs k in the overlapping regions between the overlapping images.

The global cost function is minimized to reduce the potential effect of outlier pixel pair matching errors in the color correction values created in the edge error correction process. At 1010 global cost function may be used to describe the correction process (Equation 1) as:

$$e = \Sigma_{i=1}^{n} \Sigma_{j \in l(i)} \Sigma_{k \in M(i,j)} f(r_{ij}^{k})^2$$

Where:

l(l) denotes the images overlapping with the ith image;

M(i,j) is the set of pixel matching pairs in the overlapping regions between the overlapping images; and $r_{ij}^{k}$ is the error function for each pixel matching pair.

The error function $r_{ij}^{k}$ has the following form (Equation 2):

$$r_{ij}^{k} = B_{ij}^{k_i} - g\left(g^{-1}(B_{ij}^{k_j})\frac{C_j}{C_i}\right)$$

where g is the camera response function;

$$B_{ij}^{k_i}$$

is the color value of one channel of the source pixel in the pixel matching pair; and $$B_{ij}^{k_j}$$

is the color values of the destination pixel in the pixel matching pair; and $C_i$ is the color gain value for one channel of the ith image; and $C_j$ is the color gain value for one channel of the jth image.

i is an index of all images in a set of commonly exposed array images. j is an index of all images overlapping with any ith image. k is the index of overlapping region pixels.

The error function e defined the total error of all the overlapping regions of all the picture pairs in a set of array images and minimizing the global error function allows one to solve for the color gain values $C_i$ for each image i. Multiplying each color gain value per channel with the image provides a corrected color in the overlapping (or edge) regions of the ith image. After stitching, the images are warped to a position in the final stitching coordinates, allowing determination of the overlapping region and the pixel matching pairs.

An assumption implicit in the foregoing equation 2 is that two overlapping pixels, one each in adjacent array images, should have the same color value. However, due to variations in the camera perspective, camera sensors, exposure, and possibly other factors, in reality this may not be the case. An ideal solution for the error function would result in zero—no error—which would result in a simple solution for $C_i$. Because most cases are not ideal, the robust error function removes outlier matches from having too great an impact on the correction calculation.

Because there is a potential for error from incorrect or outlier pixel matching pairs, a robust error function is used to limit the effect of such outlier errors:

$$f(x) = \begin{cases} |x|, & \text{if } |x| < x_{max} \\ x_{max}, & \text{if } |x| \geq x_{max} \end{cases}$$

Once the global cost function is completed, for each array image (i) having an overlapping image, pixel matching pairs are obtained using the image stitching process. After image stitching, the images are warped into a position in the final stitching coordinate, therefore the overlapping region can be determined by matching the pixels.

Each color channel will have a color gain value such that the process of FIG. 10 is performed on a per color channel basis. Equation 1 is minimized with respect to all the color value gains for one color channel by non-linear optimization methods, such as Levenberg-Marquardt method.

Using this methodology, at 1020 for each image i having an overlapping image j, at 1030, pixel matching pairs in overlapping regions between the overlapping image regions of the respective images i, j are determined using the pixel matching component of the stitching process ultimately used to create the merged high resolution image. At 1040, for each image i, and for each overlapping image j (1050) and for all pixels in the overlapping images (1060), the color gain value for each RGB channel between the pair of pixels is determined at 1070. The loop continues at 1075 until all color gain values for all images are determined. At 1080, the global cost function is minimized using, for example, a Levenberg-Marquardt with respect to $C_i$ to obtain a color gain value for each of the plurality of array images i. The color gain value $C_i$ obtained is thus an optimal color gain value given the constraints of processing a high resolution set of array images. At 1090 the color gain values for each image are applied to the images prior to stitching. After color this edge correction, there may be still some local color mismatches between adjacent images. Such color mismatches can be hidden by the seam finding process and blending process in the stitching algorithm, which is performed after color correction at step 780 in FIG. 7.

The technology advantageously provides high resolution color imaging from an imaging camera array using relatively standard array hardware with more accurate representation of the field of view being imaged. The color correction provided by the present technology has the advantage of being more technically accurate than prior techniques used on high resolution images as such prior techniques were not based on high color depth reference images. The system allows for high definition imaging of various scenes using generally available technology while improving on the ability of such technology to provide color-accurate, high resolution imaging. Errors which may arise by applying standard or known color correction techniques are minimized or removed using the processing technology described herein. In addition, the technology advantageously provides various color correction techniques based on the application of the reference image color before creating a high resolution image or after creating the high resolution image, allowing one to tailor the color correction techniques based on the application for which the technology is applied.

In accordance with the above advantages, a means for capturing a plurality of sets of commonly exposed images of a scene, each set suitable for creating a high resolution image or video frame, is provided. The means may comprise an imaging camera array 155. A means for capturing a reference image which has a color depth exceeding the means for capturing the plurality of sets is also provided. The means for capturing a reference image may comprise a reference camera 195. A means for synchronizing the means for capturing to create commonly exposed sets of images and reference images is also provided. A means for applying a color correction to the sets of commonly exposed images based on the reference image to create a color-corrected high resolution image is also provided. The means for applying a color correction may include an image processor 102. The means for applying a color correction may include means for applying a color correction to each set of commonly exposed images prior to creating a high resolution image or video frame, and/or means for applying a color correction to a high resolution image or video frame after creation of such frame from a set of commonly exposed images. The means for applying a color correction may include means for applying a overlapping area color correction to overlapping ones of the plurality of commonly exposed images in a set of commonly exposed images.

In the aforementioned description, the figures present various embodiments of processing using a reference image and an array image. In embodiments where processes are performed on ones of array images of a commonly exposed set of array images, parallel processing of any number of array images from a set may occur in relation to a reference image in order to increase processing speed.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An imaging apparatus, comprising:
a receiver adapted to receive a plurality of array images from a camera array comprising a plurality of imaging cameras, and each array image from one imaging camera partially covers a scene and partially overlaps with an array image inputted by an adjacent imaging camera, and all the array images cover the scene together, and receive a reference image covering the scene from a reference camera;
a synchronization controller coupled to the camera array and the reference camera, the synchronization controller adapted to direct the reference camera and the plurality of imaging cameras to capture the scene, the reference camera adapted to provide at least one reference image of the reference camera field of view and the plurality of imaging cameras adapted to provide the plurality of array images of the camera array field of view; and
an image processor adapted to apply a color correction based on the at least one reference image to a high resolution image formed from the plurality of array images.

2. The imaging apparatus of claim 1 wherein the synchronization controller directs that the imaging cameras and the reference camera commonly capture the scene at the same time.

3. The imaging apparatus of claim 1 wherein:
the imaging cameras are adapted to capture video imaging having a first frame rate and the reference camera is adapted to capture images at a second frame rate less than the first frame rate of the imaging camera, and
the image processor adapted to apply the color correction based on the at least one reference image to multiple high resolution images formed from multiple sets of array images.

4. The imaging apparatus of claim 1 wherein:
a set of array images is commonly exposed;
the image processor is adapted to apply the color correction to each of the array images; and
the image processor is further adapted to merge the array images into the high resolution image.

5. The imaging apparatus of claim 4 wherein the image processor is operable to apply an edge color correction to each image in the array images prior to the merge of the array images.

6. The imaging apparatus of claim 1 wherein the high resolution image is a merged image of a plurality of commonly exposed array images, and the image processor is operable to apply the color correction based on the reference image to the merged image.

7. A method of creating a color corrected high resolution image, comprising:
obtaining a set of a plurality of at least partially overlapping commonly exposed array images of a first field of view of a scene using a camera array comprising a plurality of imaging cameras;
obtaining a reference image of a second field of view including the scene using a reference camera, the reference image having a color depth greater than each of the plurality of at least partially overlapping commonly exposed array images, the first field of view and the second field of view at least partially overlapping; and
applying a color correction to the plurality of at least partially overlapping commonly exposed array images based on the color depth of the reference image to create the color corrected high resolution image using an image processor.

8. The method of claim 7 wherein applying the color correction comprises merging the plurality of partially overlapping commonly exposed array images using a stitching process to create a high resolution color image followed by applying the color correction to a high resolution color image.

9. The method of claim 7 wherein applying a color correction comprises applying the color correction to each of the plurality of partially overlapping commonly exposed array images followed by creating a high resolution merged image by applying a stitching process to the plurality of partially overlapping commonly exposed array images.

10. The method of claim 7 wherein applying the color correction comprises:
applying a color transform from the reference image to each of the plurality of partially overlapping commonly exposed array images;
determining overlap regions between adjacent ones of each of the partially overlapping commonly exposed array images;
determining corresponding pixel pairs in each of the overlap regions;
calculating a color gain value between each of the adjacent ones of the commonly exposed array images based on the corresponding pixel pairs in the overlap regions; and
applying the color gain value to each of the adjacent ones of the partially overlapping commonly exposed array images.

11. The method of claim 10 wherein the calculating a color gain value comprises solving for a color gain value ($C_i$) for each image pair using an error function based on a camera response, the color gain value of a pixel in a pixel pair from one image in the pixel pair or a color gain value of a matching pixel in another image in the pixel pair.

12. The method of claim 11 wherein the method further includes calculating the color gain value for each color channel of each image having overlapping images and for each pixel pair, and minimizing a global error to determine an optimal color gain value for each image, wherein applying the color gain value comprises applying the optimal color gain value for each image.

13. The method of claim 11 wherein the method further includes obtaining multiple sets of a plurality of at least partially overlapping commonly exposed images of a field of view of a first scene, each set comprising one of a plurality of frames captured at a frame rate, and wherein applying the color correction comprises applying the color correction to each of the sets.

14. The method of claim 11 wherein obtaining the reference image comprises obtaining multiple reference images at a frame rate less than or equal to the frame rate at which the sets of the plurality of overlapping commonly exposed array images are captured, and wherein applying a color correction comprises applying the color correction base on the reference image captured nearest in time prior to a time at which a set of overlapping commonly exposed array images are captured.

15. An high resolution imaging device comprising:
a first camera system adapted to generate video imaging comprising a plurality of frames, each frame comprising a set of commonly exposed images of a scene, each of the images in the set of commonly exposed images including at least a portion of a field of view of the scene and at least partially overlapping at least one adjacent image having a different portion of the field of view;
a second camera system adapted to generate a plurality of reference images of the scene from a reference field of view, each of the plurality of reference images having a color depth greater than the color depth of each of the plurality of commonly exposed images, at least a portion of the plurality of reference images being commonly exposed with ones of the plurality of frames;
an image processor including
a color corrector operable to apply a color correction based on at least one of the plurality of reference images to a corresponding one of the plurality of frames, the color correction applied to each of the set of commonly exposed images of the scene relative to a matched portion of the at least one of the plurality reference images to provide a set of color-corrected plurality images; and
an image stitcher operable to create a high resolution image from the color corrected plurality of images.

16. The high resolution imaging device of claim 15 further including a synchronization controller coupled to the first camera system and the second camera system, the synchronization controller operable to instruct the first camera system and the second camera system to create the video imaging and the reference images of the scene.

17. The high resolution imaging device of claim 15 wherein the color corrector includes instructions operable to calculate a color gain value ($C_i$) for each of an image pair comprising a portion of the at least one of the plurality of reference images and one of the commonly exposed images using an error function based on a camera response function, the color gain value of a pixel in a pixel pair from the portion of the at least one of the plurality of reference images, and the color gain value of a matching pixel in one of the commonly exposed images in the pixel pair.

18. The high resolution imaging device of claim 17 wherein the color correction further includes calculating the color gain value for each color channel of each image in the commonly exposed images having overlapping other ones of the commonly exposed images and for each pixel pair in overlapping areas of the images, and minimizing a global error to determine an optimal color gain value for each image.

19. The high resolution imaging device of claim 18 wherein the color correction further includes applying the optimal color gain value to each image in the set of commonly exposed images.

20. The high resolution imaging device of claim 19 further including creating a high resolution frame from the set of commonly exposed images.

* * * * *